3,387,017
PENTALENE DERIVATIVES AND THEIR PRODUCTION
Marcel Joseph Celestin Lefort, Lyon, France, assignor to Rhone-Poulenc S.A., Paris, France, a French body corporate
No Drawing. Filed Oct. 15, 1964, Ser. No. 404,158
Claims priority, application France, Oct. 17, 1963, 950,922
6 Claims. (Cl. 260—448.8)

ABSTRACT OF THE DISCLOSURE

New silyl-pentalenes, useful as additives for organosilicone resins and as intermediates in the production of pentalene, are made by reacting 1,5-cyclooctadiene with a tri-substituted silane in the presence of a free radical catalyst.

---

The present invention provides new derivatives of bicyclo[3.3.0]octane, or pentalene, containing silyl groups, and a process for their production.

These new derivatives have the formula:

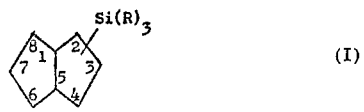

(I)

where the symbols R are the same or different and represent halogen, e.g. chlorine, hydrocarbon radicals, hydrocarbonoxy radicals, or carboxylic acyloxy radicals, such as alkoxy, cycloalkoxy, aryloxy, or acyloxy radicals, and more especially lower alkyl, lower alkanoyloxy or phenyl. The term "lower" means that the group in question contains a maximum of 4 carbon atoms. Silicon derivatives of pentalene have not previously been described.

According to a feature of the invention, the new compounds are produced by reacting cyclooctadiene-1,5 with a trisubstituted silane of formula: HSiR₃ (where R is as hereinbefore defined) in the presence of a free-radical generating catalyst, and isolating a monosubstituted pentalene from the reaction mixture. Where the silane starting material contains one or more halogen atoms, one or more of these may subsequently be replaced by another radical within the definition of R.

For example, the compounds of Formula I where R represents an alkyl, alkenyl, cycloalkyl, cycloalkenyl or aryl radical may be made by first preparing a compound of Formula I where R represents halogen and then reacting this compound with a corresponding Grignard reagent. This is especially appropriate when in the desired compound R is lower alkyl or phenyl.

It is also possible to produce compounds of Formula I where R represents a carboxylic acyloxy radical, especially lower alkanoyloxy, by reacting an organic carboxylic acid anhydride with a halogenosilylpentalene.

It is known to react silanes, especially trichlorosilane and triethylsilane, with cyclooctadiene-1,5 in the presence of platinum on an alumina support (cf. Pike and McDonagh, J. Chem. Soc. 2831 [1963]); but these workers obtained only the corresponding trichlorosilyl-cyclooctene and triethylsilylcyclooctene, and did not observe any formation of a compound containing an internal bridge. The formation of such an internal bridge in the process of the invention is, therefore, entirely unexpected.

The presence of the bicyclo[3.3.0]octane skeleton in the new compounds has been proved by elementary analysis, the bromine index, which proves the absence of a double bond, and by nuclear magnetic resonance spectrometry by comparing the resonance spectrum of the new compounds with that of cyclooctadiene on the one hand and with that of bicyclo[3.3.0]octanone-2 on the other. While it is not known with absolute certainty whether the silicon residue is attached in position 2 or 3, it is believed to be attached in position 2.

Cyclooctadiene-1,5 used in the process of the invention is readily accessible by dimerizing butadiene.

The silane derivative HSiR₃ may be any compound in which the R groups are identical, for example, trichlorosilane, triethoxysilane, triacetoxysilane, or triethylsilane, or different, for example, methyldichlorosilane, phenyldichlorosilane, dimethylchlorosilane or methyldiacetoxysilane.

The free-radical generating catalyst may be any substance that on thermal decomposition furnishes free radicals, e.g. organic peroxides, such as benzoylperoxide and acetylperoxide, and azodiisobutyronitrile. The reaction can be performed by heating at a temperature from 150° to 250° C., more advantageously from 175° to 225° C., or at a lower temperature, e.g. below 100° C., such as room temperature (about 15° C.) if the reaction is performed in the presence of actinic light or other electromagnetic radiation of shorter wavelength, for example radiation of a wavelength below $0.4\mu$, such as ultraviolet radiation or γ-rays.

The new compounds have a variety of uses. They may be incorporated in organosilicone resin compositions which are completely compatible with alkyd resins and other polyesters. They act as anti-thixotropizing agents for organosilicone elastomers. They may also be used in the manufacture of pentalene, since, for example, on treatment with sodium hydroxyole, trimethylsilylpentalene is easily converted into trimethylsilanol and pentalene.

The following examples illustrate the invention.

Example 1

A 1 litre autoclave is charged with 216 g. (2 mols) of cyclooctadiene-1,5, 237 g. (1.76 mols) of trichlorosilane and 10 g. of benzoyl peroxide. The mixture is heated for 42 hours at 200° C. After allowing the autoclave to cool, the unreacted trichlorosilane and cyclooctadiene are distilled off, after which 220 g. of product are distilled, which has the following characteristics: B.P.=123°–125° C./ 23 mm. Hg or 74°–75° C./0.9 mm. Hg, and $d_4^{20}$=1.232. This product is trichlorosilylpentalene.

Example 2

A 1 litre autoclave is charged with 216 g. (2 mols) of cyclooctadiene-1,5, 202 g. (1.76 mols) of methyldichlorosilane, and 10 g. of benzoylperoxide, and the mixture is heated for 66 hours at 200° to 205° C. The unreacted methyldichlorosilane and cyclooctadiene-1,5 are distilled off, and after this 87 g. of a product are obtained which is methyldichlorosilylpentalene, having the following characteristics: B.P.=74°–75° C./1.3 mm. Hg, and $d_4^{20}$= 1.102.

Example 3

A Grignard reagent from 36 g. (1.5 gram atoms) of magnesium and 212 g. (1.5 mols) of methyl iodide in 400 cc. of anhydrous diethyl ether is added dropwise to 81 g. (0.33 mol) of trichlorosilylpentalene and the mixture is refluxed for 8 hours. The reaction mixture is then cooled, poured into ice-water, and neutralized with aqueous hydrochloric acid solution. The supernatant liquid is decanted, the organic layer extracted with 2×200 cc. of ether, and the organic extracts are then combined and the ether removed. On distillation of the residue, there are obtained 35.3 g. of trimethylsilylpentalene, having the following characteristics: B.P.=89°–90° C./15 mm. Hg, $d_4^{20}$=0.8648, and $n_D^{20}$=1.4679.

Example 4

A 250 cc. distillation flask is charged with 48.7 g. (0.2 mol) of trichlorosilylpentalene and 67 g. of acetic anhydride. The mixture is slowly heated and the theoretical amount of acetyl chloride is collected. The excess acetic anhydride is then removed by distillation, and the residue is distilled to yield 31 g. of triacetoxysilylpentalene, having the following characteristics: B.P.=114° C./0.07 mm. Hg, and $d_4^{20}$=1.1419.

Example 5

A 1 litre autoclave is charged with 108 g. (1 mol) of cyclooctadiene-1,5, 118 g. (0.66 mol) of phenyldichlorosilane, and 5 g. of benzoylperoxide, and the mixture is heated for 18 hours at 198° to 200° C. After the unreacted phenyldichlorosilane and cyclooctadiene have been distilled off, 39 g. of (phenyldichlorosilyl)-pentalene are obtained, having the following characteristics: B.P. 129°–130° C./0.45 mm. Hg, and $d_4^{20}$=1.1860.

Example 6

A 1 litre autoclave is charged with 147 g. (1.3 mols) of cyclooctadiene-1,5, 135 g. (1 mol) of trichlorosilane and 5 g. of azodiisobutyronitrile, and the mixture is heated for 44 hours at 195° to 200° C. After the unreacted trichlorosilane and cyclooctadiene have been distilled off 93.5 g. of (trichlorosilyl)-pentalene, boiling at 123°–125° C. under a pressure of 16 mm. Hg are obtained.

Example 7

A 3 litre flask, carrying a reflux condenser and equipped with a quartz tube in which is an ultraviolet lamp dipping into the centre of the flask, is charged with 903 g. (6.7 mols) of trichlorosilane, 60 g. (0.55 mol) of cyclooctadiene-1,5 and 2.7 g. of benzoyl peroxide.

The mixture is then irradiated for 160 hours at the reflux temperature (36° C.). After the unreacted trichlorosilane and cyclooctadiene-1,5 have been distilled off, 85 g. of a fraction boiling at 74° to 75° C. under 0.9 mm. Hg pressure are obtained, which is shown by chromatographic examination to consist of 25 g. of (trichlorosilyl)-5-cyclooctene and 60 g. of (trichlorosilyl)-pentalene.

I claim:
1. A pentalene derivative of the formula:

wherein each of the symbols R is chlorine, lower alkyl, lower alkanoyloxy, or phenyl.
2. Trichlorosilylpentalene.
3. Methyldichlorosilylpentalene.
4. Trimethylsilylpentalene.
5. Triacetoxysilylpentalene.
6. Phenyldichlorosilylpentalene.

References Cited
UNITED STATES PATENTS

| | | | |
|---|---|---|---|
| 2,762,823 | 9/1956 | Speier | 260—448.2H |
| 2,872,471 | 2/1959 | Ramsden et al. | 260—448.2H |
| 3,188,336 | 6/1965 | Haszeldine | 260—448.2 |
| 3,256,333 | 6/1966 | Dowbenko | 204—158 XR |
| 3,290,359 | 12/1966 | Mark | 260—448.2 XR |

TOBIAS E. LEVOW, *Primary Examiner.*

P. F. SHAVER, *Assistant Examiner.*